(12) United States Patent
Soda et al.

(10) Patent No.: US 8,640,566 B2
(45) Date of Patent: Feb. 4, 2014

(54) THROTTLE DEVICE FOR VEHICLE

(75) Inventors: Hajime Soda, Saitama (JP); Hiroto Hibi, Saitama (JP); Tetsuya Kondo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1428 days.

(21) Appl. No.: 12/140,100

(22) Filed: Jun. 16, 2008

(65) Prior Publication Data

US 2009/0007716 A1    Jan. 8, 2009

(30) Foreign Application Priority Data

Jul. 3, 2007    (JP) .................. 2007-175246
Jul. 3, 2007    (JP) .................. 2007-175247

(51) Int. Cl.
*B62K 23/04* (2006.01)

(52) U.S. Cl.
USPC .................. 74/488; 74/504; 123/399

(58) Field of Classification Search
USPC ............. 74/473.12, 485, 488, 491, 504; 324/207.2, 207.19, 174; 73/114.36; 123/399; 180/170, 219
IPC ........................................ B62K 23/04
See application file for complete search history.

(56) References Cited

U.S. PATENT DOCUMENTS

| | | | | |
|---|---|---|---|---|
| 6,038,923 A | * | 3/2000 | Lin | 73/488 |
| 6,144,125 A | * | 11/2000 | Birkestrand et al. | 310/68 B |
| 2004/0216550 A1 | * | 11/2004 | Fallak et al. | 74/551.9 |
| 2006/0113989 A1 | * | 6/2006 | Nicolosi | 324/207.2 |
| 2007/0084658 A1 | | 4/2007 | Yamazaki et al. | |
| 2009/0007716 A1 | * | 1/2009 | Soda et al. | 74/504 |

FOREIGN PATENT DOCUMENTS

| | | | |
|---|---|---|---|
| DE | 100 27 193 A1 | 12/2001 | |
| EP | 1365128 A1 * | 11/2003 | ............ F02D 11/02 |
| JP | 58-174393 U | 11/1983 | |
| JP | 6-39330 U | 5/1994 | |
| JP | 2001-246960 A | 9/2001 | |
| JP | 2003-328784 A | 11/2003 | |
| JP | 2005-41259 A | 2/2005 | |
| JP | 2005-147007 A | 6/2005 | |
| JP | 2005-194925 A | 7/2005 | |
| JP | 2007-113418 A | 5/2007 | |

* cited by examiner

*Primary Examiner* — Thomas Diaz
(74) *Attorney, Agent, or Firm* — Birch, Stewart, Kolasch & Birch, LLP (57) ABSTRACT

A reduction in the size of a housing for containing a magnetic sensor is provided for a throttle device for a vehicle in which the turning amount of a throttle grip is detected by use of the magnetic sensor. An extension part of the throttle grip is provided at its outer periphery with an enlarged diameter part for holding magnets of the magnetic sensor. A right switch box is provided with Hall sensors of the magnetic sensor, and the enlarged diameter part and each of the Hall sensors are opposed to each other in the axial direction of a right handle bar. The throttle grip is urged toward the throttle full-closing position by a grip urging mechanism. The throttle full-closing position is maintained by only an urging force exerted from the grip urging mechanism.

9 Claims, 6 Drawing Sheets

THROTTLE DEVICE FOR VEHICLE

CROSS-REFERENCE TO RELATED APPLICATIONS

The present application claims priority under 35 USC 119 to Japanese Patent Application No. 2007-175247 filed on Jul. 3, 2007 and Japanese Patent Application No. 2007-175246 filed on Jul. 3, 2007 the entire contents of which are hereby incorporated by reference.

BACKGROUND OF THE INVENTION

1. Field of the Invention

The present invention relates to a throttle device for a vehicle such as a motorcycle.

2. Description of Background Art

Conventionally, a throttle device is known wherein the turning amount of a throttle grip is detected by use of a magnetic sensor. See, for example, Japanese Patent Laid-open No. 2005-194925. This throttle device has a configuration wherein the throttle grip is provided, at the outer periphery on the handle base end side thereof, with a projecting part for holding a magnet of the magnetic sensor, a housing (switch box) for containing and holding the handle base end side of the throttle grip is provided with a sensor body (Hall sensor) of the magnetic sensor, and the projecting part and the sensor body are opposed to each other in a radial direction of a handle bar.

In the conventional configuration as above-mentioned, the projecting part at the outer periphery of the throttle grip and the sensor body on the housing side are opposed to each other in a radial direction of the handle bar, so that the housing for containing these components tends to be enlarged in size, particularly in a radial direction of the handle bar.

A throttle device is known wherein a cable type (mechanical type) transmission mechanism is provided for controlling the throttle opening by a turning torque on a throttle grip. A turning operation on the throttle grip is conducted at the time of a predetermined motive power control such as a constant vehicle speed maintaining control (auto cruise control). When an input to the transmission mechanism or the like by the turning operation is detected, the motive power control is cancelled. See, for example, Japanese Patent Laid-open No. 2001-246960.

In addition, a throttle device is known wherein a throttle grip is turnable between a throttle full-opening position and a beyond-throttle-full-closure position located beyond a throttle full-closing position. An engaging means is provided for controlling the turning of the throttle grip by engaging with the throttle grip between the throttle full-closing position and the beyond-throttle-full-closure position. A detection means is provided for detecting that the throttle grip has been turned to the beyond-throttle-full-closure position. A predetermined motive power control such as an idling-stopping control is conducted when the detection means has detected that the throttle grip is turned to the beyond-throttle-full-closure position. See, for example, Japanese Patent Laid-open No. 2005-147007.

In this case, the turning of the throttle grip toward the throttle-closing side is stopped by the engagement with the engaging means. From this condition the throttle grip is operated comparatively strongly so as to cancel the engagement, whereby it is made possible to turn the throttle grip to the beyond-throttle-full-closure position. Similarly, the cancellation of the engagement is needed also at the time of turning the throttle grip from the beyond-throttle-full-closure position toward the throttle-opening side.

Further, in the former of the above-mentioned configurations, it is necessary that detection means for detecting the turning of the throttle grip is provided at an intermediate part of the transmission mechanism or is connected through a transmission mechanism provided separately. Thus, a complicated configuration is necessary for detecting the turning of the throttle grip.

In addition, in the latter of the above-mentioned configurations, a comparatively strong operating force is needed at the time of turning the throttle grip from the throttle full-closing position to the beyond-throttle-full-closure position and at the time of returning the throttle grip from the beyond-throttle-full-closure position to the throttle full-closing position, so that the operation load necessary for a predetermined motive power control is high.

SUMMARY AND OBJECTS OF THE INVENTION

Accordingly, an object of an embodiment of the present invention relates to a throttle device for a vehicle wherein the amount of turning of a throttle grip is detected by the use of a magnetic sensor to provide a reduction in the size of a housing for containing the magnetic sensor.

As means of solving the above problem, according to an embodiment of the present invention, a throttle device for a motorcycle includes a throttle grip throttle grip turnably supported on a handle bar with a housing, for example, a right switch box, for containing and holding an extension part, extending toward the handle base end side, of the throttle grip. The turning amount of the throttle grip is detected by the use of a magnetic sensor arranged in the housing. The extension part of the throttle grip is provided at the outer periphery thereof with a projecting part, an enlarged diameter part, for holding a magnet of the magnetic sensor, the housing is equipped with a sensor body, for example, a Hall sensor of the magnetic sensor. The projected part and the sensor body are opposed to each other in the axial direction of the handle bar.

According to an embodiment of the present invention, the sensor body is disposed on each of both sides of the projecting part in the axial direction of the handle bar.

According to an embodiment of the present invention, the base end side of a lever member (for example, a front brake bar) is swingably supported on the front side of the throttle grip on the handle bar at a position on the base end side relative to the housing. The sensor body is disposed on the front side of the housing and on the upper side relative to the swinging range (for example, the swinging range Y) of the lever member.

According to an embodiment of the present invention, the housing is equipped with a manual switch, and the sensor body is disposed in the housing at a position on the handle base end side relative to the switch.

According to an embodiment of the present invention, a return spring for the throttle grip is provided in the housing, and the sensor body is disposed in the housing at a position on the handle base end side relative to the return spring.

According to an embodiment of the present invention, the extension part of the throttle grip is provided with a notch hole along the turning direction thereof, a positioning protrusion part of the housing for positioning with respect to the handle bar is passed through the notch hole, and the turning range of the throttle grip is determined by the positioning protrusion part and the notch hole.

According to an embodiment of the present invention, the housing is split into front and rear bodies, and the sensor is disposed on the front side in the housing while switches are disposed on the rear side in the housing.

According to an embodiment of the present invention, the projected part at the outer periphery of the throttle grip and the sensor body on the housing side are opposed to each other in the axial direction of the handle bar, whereby the increase in the size of the housing in the radial direction of the handle bar can be suppressed. This ensures that, even in the case where an existing lever member having an adjusting mechanism is disposed on the front side of the throttle grip, a layout space inclusive of a space for the stroke of the lever member can be easily secured.

According to an embodiment of the present invention, the sensor condition can be determined by comparing outputs from the sensor bodies.

According to an embodiment of the present invention, the sensor body can be arranged while avoiding switches which are disposed on the rear side (the rider's side) on the housing. In addition, by disposing the sensor body on the upper side in the housing, flooding (immersion) inside the housing can be restrained, and a swinging range of the lever member on the front side of the housing can be secured easily.

According to an embodiment of the present invention, the manual switches can be disposed close to the throttle grip gripped by the rider, whereby the operability of the switches can be enhanced.

According to an embodiment of the present invention, the return spring for the throttle grip gripped by the rider can be disposed close to the throttle grip, and a reaction force of the return spring can be exerted on the throttle grip comparatively directly, whereby the feeling in operating the throttle grip can be improved.

According to an embodiment of the present invention, means for determining the turning range of the throttle grip can be easily configured by utilizing the positioning protrusion part of the housing for positioning with respect to the handle bar.

It is an object of an embodiment of the present invention, to provide a throttle device for a vehicle wherein a predetermined motive power control is conducted when a throttle grip is turned to a beyond-throttle-full-closure position. A simplified configuration is provided for detecting the turning of the throttle grip and to alleviate the operational load on the throttle grip in the vicinity of the throttle full-closing position.

As means for solving the above problems, a throttle device for a vehicle, for example, a motorcycle 1, is provided that includes a throttle grip turnably supported on a handle bar. The throttle grip is turnable between a throttle full-opening position and a beyond-throttle-full-closure position located beyond a throttle full-closing position. A predetermined motive power control is conducted when the throttle grip is turned to the beyond-throttle-full-closure position. The throttle grip is urged by a grip urging mechanism toward the throttle full-closing position from each of the side of the throttle full-opening position and the side of the beyond-throttle-full-closure position. The throttle full-closing position is maintained by only an urging force exerted from the grip urging mechanism. A sensor is provided for detecting that the throttle grip has been turned to the beyond-throttle-full-closure position in a housing for holding the handle base end side of the throttle grip.

According to an embodiment of the present invention, a constant vehicle speed maintaining control is cancelled when the throttle grip is turned to the beyond-throttle-full-closure position.

According to an embodiment of the present invention, the sensor is operative to electrically detect the turning amount of the throttle grip.

According to an embodiment of the present invention, the throttle grip is provided on the handle base end side thereof with a notch hole along the turning direction thereof, a positioning protrusion part of the housing for positioning with respect to the handle bar is passed through the notch hole, and the turning range of the throttle grip is determined by the positioning protrusion part and the notch hole.

According to an embodiment of the present invention, the housing is equipped with a manual switch on the handle tip side, the grip urging mechanism is disposed on the handle base end side in the housing, and the sensor is disposed between the grip urging mechanism and the switch.

According to an embodiment of the present invention, the sensor for detecting the turning of the throttle grip to the beyond-throttle-full-closure position is provided in the housing for holding the handle base end side of the throttle grip, whereby the sensor and the throttle grip can be linked directly to each other. Thus, it is possible to simplify the configuration necessary for detecting the turning of the throttle grip and for enhancing the accuracy of the detection.

In addition, the throttle grip is urged by the grip urging mechanism toward the throttle full-closing position from each of the side of the throttle full-opening position and the side of the beyond-throttle-full-closure position. The throttle full-closing position is maintained by only the urging force supplied from the grip urging mechanism, whereby the throttle grip can be continuously turned in the vicinity of the throttle full-closing position by a comparatively small operating force for just resisting the urging force of the grip urging mechanism. This makes it possible to alleviate the operational load for setting the throttle grip in the vicinity of the throttle full-closing position and to alleviate the operational load necessary for a predetermined motive power control, for example, cancellation of a constant vehicle speed maintaining control.

According to an embodiment of the present invention, it is possible to easily configure a so-called by-wire type throttle device for electrically detecting the turning amount of the throttle grip and electrically controlling the throttle opening on the basis of the detected data.

According to an embodiment of the present invention, means for determining the turning range of the throttle grip can be easily configured by utilizing a positioning protrusion part of the housing for positioning with respect to the handle bar.

According to an embodiment of the present invention, the switch, the grip urging mechanism and the sensor are aligned in the axial direction of the handle bar, whereby an increase in the size of the housing in the radial direction of the handle bar can be restrained. Thus, it is possible to easily secure a layout space in the case where an existing lever member having an adjusting mechanism is disposed on the front side of the throttle grip. In addition, the operability of the manual switch can be enhanced by disposing the switch closer to the throttle grip gripped by the rider. Thus, the connection of the electric wires can be facilitated by disposing the switch and the sensor close to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below referring to the drawings. The front, rear, left, right and the like sides or directions in the following description are the same as those in the vehicle, unless otherwise specified. In addition, arrow FR in the figures indicates the front side of the vehicle, arrow LH indicates the left-hand side of the vehicle, and arrow UP indicates the upper side of the vehicle.

Figure 1:
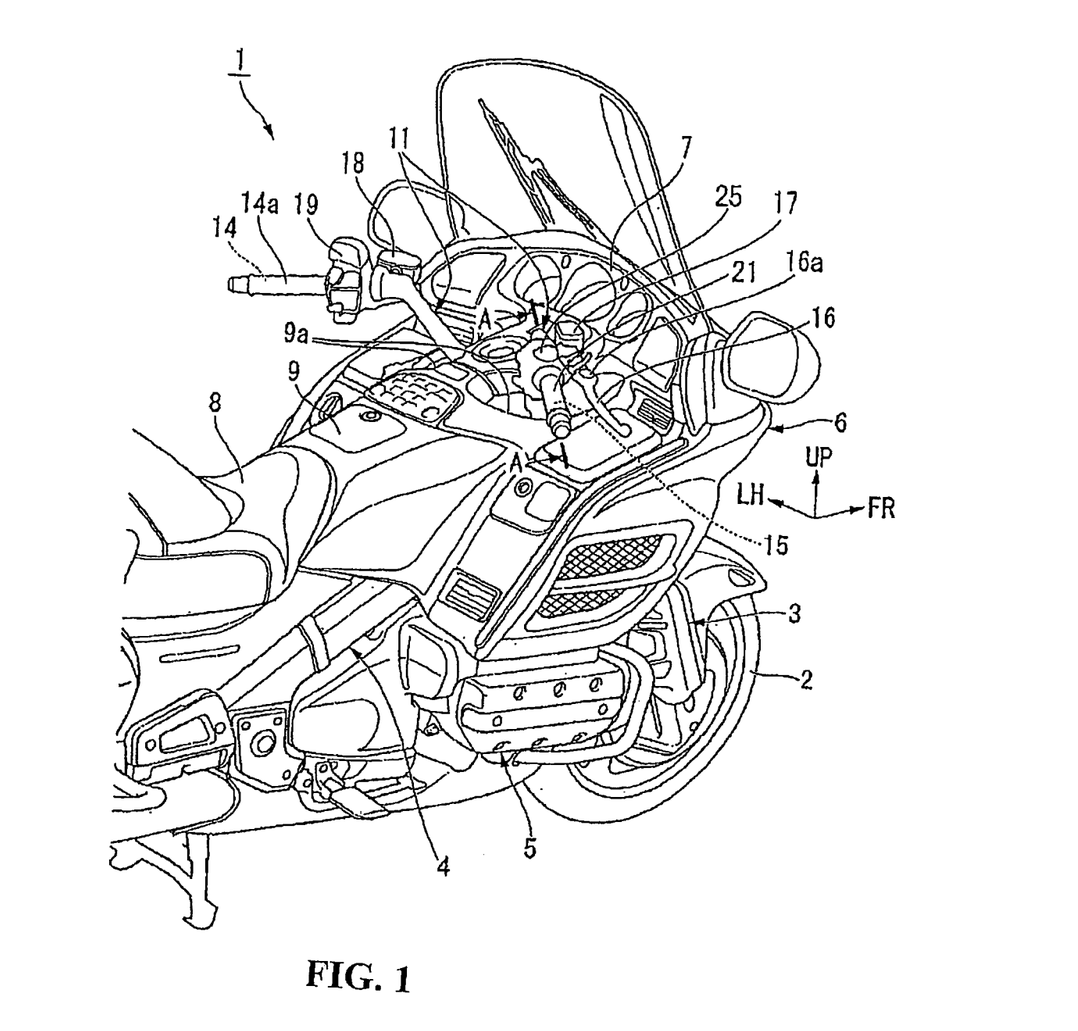
FIG. 1 is a perspective view, as viewed from the rear upper side, of a motorcycle according to an embodiment of the present invention.

A motorcycle (bar handle vehicle) 1 shown in FIG. 1 has a front wheel 2 steerably rotatably supported on a front end part of a body frame 4 through a front fork type steering mechanism 3. A base end part of a bar handle 11 for steering the front wheel is integrally mounted to an upper end part of the front fork type steering mechanism 3. An engine 5 of, for example, a water-cooled four-stroke horizontal opposed six-cylinder type as a prime mover of the motorcycle 1 is mounted on a substantially central part of the body of the motorcycle 1.

A front part of the body of the motorcycle 1 is covered with a front cowl 6. A meter panel 7 is provided on the inside of a front part of the front cowl 6, and a portion ranging from the meter panel 7 to a rider's seat 8 on the rear side thereof is covered with a top shelter 9. A front part of the top shelter 9 is provided with a passing hole 9a for the bar handle 11 extending upward from the lower side thereof.

The bar handle 11 is provided to be left-right symmetrical with reference to the left-right center of the body (the center in the vehicle width direction) and is composed, for example, of left and right handle members which are separate bodies. The left and right handle members have left and right handle bars 14, 15 which extend skewly upward from the front fork type steering mechanism 3 toward the rear left and right outer sides and then extend slightly downwards toward the rear left and right outer sides. The left and right handle bars 14, 15 are cylindrical members extending rectilinearly. In addition, the bar handle 11 may be composed of a handle member having integral left and right parts.

The motorcycle 1 has an oil hydraulic type brake system. A front brake lever 16, as an operating element of the brake system, is provided on the front side of and along the right handle bar 15. The base end side (the body left-right center side) of the front brake lever 16 is turnably supported on a brake master cylinder 17 so that it can be swung toward and away from the right handle bar 15. The brake master cylinder 17 is mounted to the base end side (the body left-right center side) of the right handle bar 15 through a clamp 17a (see FIGS. 2 and 5). Symbol 16a in FIG. 1 denotes an adjusting mechanism which is provided on the base end side of the front brake lever 16.

Figure 2:
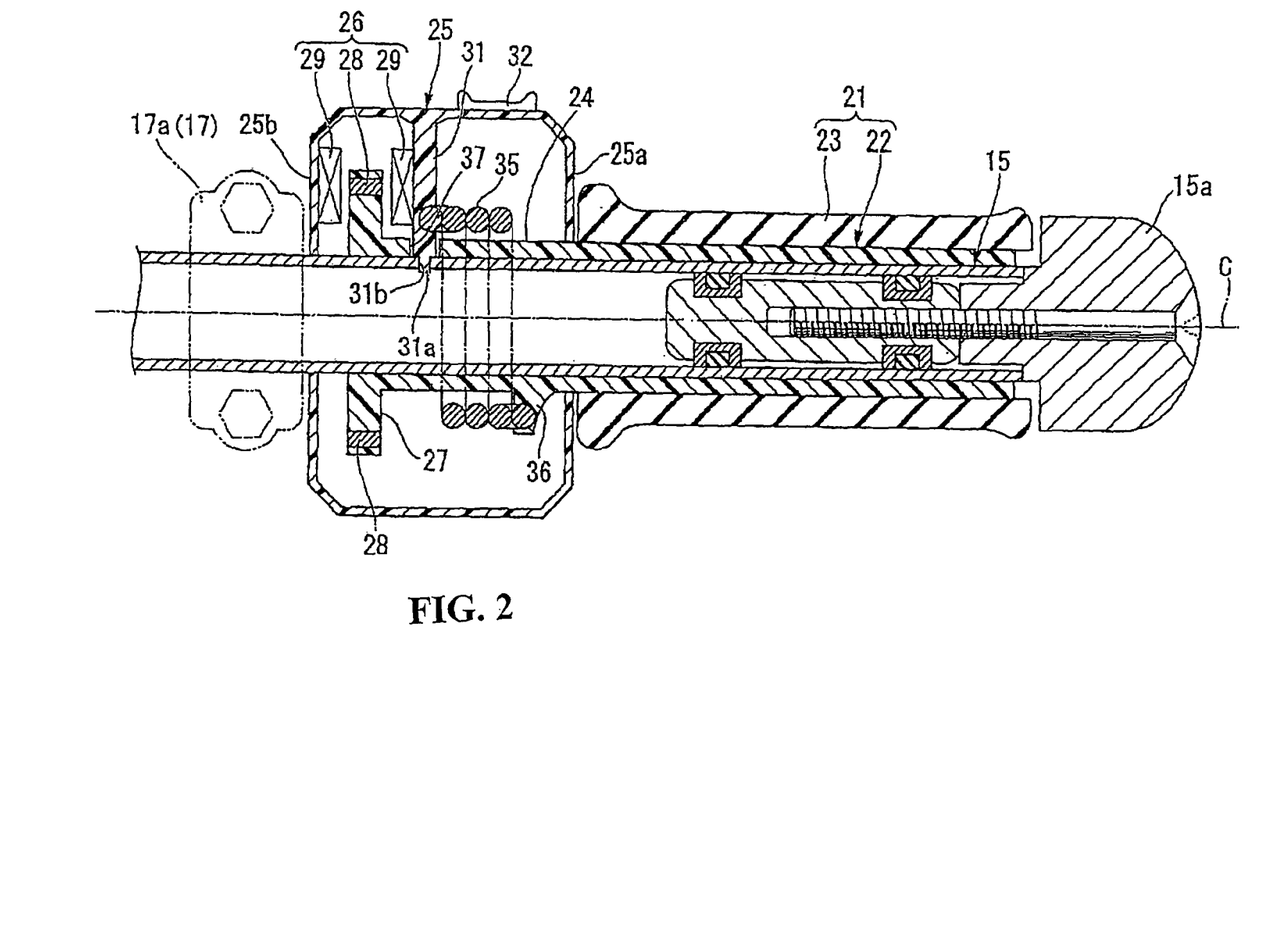
FIG. 2 is a sectional view taken along line A-A of FIG. 1.

Referring to FIG. 2, a throttle grip 21 through which the right handle bar 15 is passed is turnably supported on the tip side (the body left-right outer side) of the right handle bar 15. The throttle grip 21 has a resin-made sleeve 22 constituting an inner layer thereof, and a rubber-made grip body 23 integrally attached to the outer periphery of the sleeve 22. The sleeve 22 extends to the handle base end side (the body left-right center side) beyond an end part on the handle base end side of a grip body 23 to be gripped by the rider. This portion constitutes an extension part 24, extending toward the handle base end side, of the throttle grip 21.

The extension part 24 is contained and held in a right switch box 25 attached to the right handle bar 15 on the handle base end side relative to the grip body 23. On the handle base end side relative to the right switch box 25, the above-mentioned clamp 17a is attached to the right handle bar 15. Symbol C in FIG. 2 denotes a center axis of the right handle bar 15 with a vibration-proofing handle weight 15a attached to the tip side of the right handle bar 15.

Referring to FIG. 1, the motorcycle 1 has an oil hydraulic type clutch system. A clutch lever (omitted in the figure), constituting an operating element of the clutch system, is provided on the front side of the left handle lever 14. A base end part of the clutch lever is rotatably supported on a clutch master cylinder 18, which is attached to the base end side of the left handle bar 14. A rubber-made grip body 14a is integrally mounted to the tip side of the left handle bar 14. On the handle base end side relative to the grip body 14a, a left switch box 19 is attached to the left handle bar 14.

The motorcycle 1 has a so-called by-wire type throttle device for electrically controlling the throttle opening in the engine 5 based on detection data obtained through electrically detecting the turning amount of the throttle grip 21 by a contactless-type magnetic sensor 26.

Figure 4:
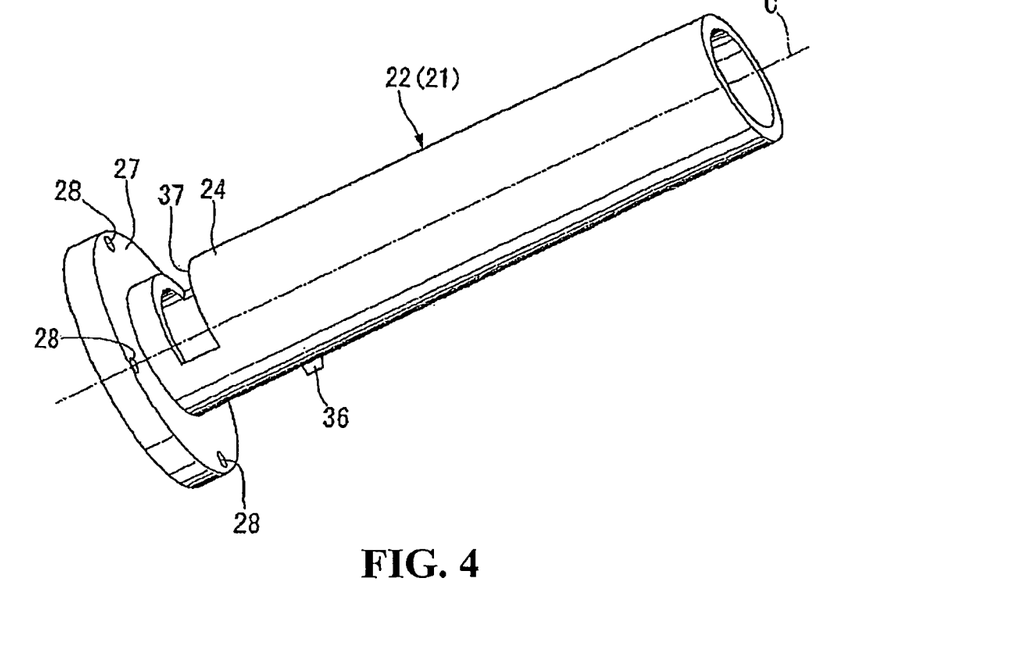
FIG. 4 is a perspective view of a sleeve of a throttle grip in the motorcycle.

As shown in FIGS. 2 and 4, the extension part 24 of the throttle grip 21 is integrally provided, at the outer periphery of an end part on the handle base end side thereof, with an enlarged diameter part (projected part) 27 which has a flange-like shape, for example. The enlarged diameter part 27 holds a plurality of magnets 28 of the magnetic sensor 26, which are arranged along the circumferential direction (the turning direction of the throttle grip 21), for example. The extension part 24 penetrates a side wall 25a on the handle tip side (the body left-right outer side) of the right switch box 25. A tip part of the extension part 24 reaches the vicinity of a side wall 25b on the handle base end side of the right switch box 25. Thus, the enlarged diameter part 27 is disposed on the handle base end side inside the right switch box 25.

On the handle base end side inside the right switch box 25, a Hall sensor 29 is integrally held as a sensor body of the magnetic sensor 26. The hall sensor 29 is provided at one position in the turning direction of the throttle grip 21 with reference to the plurality of the magnets 28, and the Hall sensor 29 detects the turning amount of the throttle grip 21 according to a magnetic force which varies depending on the turned positions of the magnets 28.

A pair of the Hall sensors 29 is provided respectively on both sides of the enlarged diameter part 27 in the axial direction of the right handle bar 15 (this direction is a direction along the axis of the right handle bar 15, and will sometimes be referred to as the handle axis direction). Thus, each of the Hall sensors 29 and the enlarged diameter part 27 (the magnets 28) are opposed to each other in the handle axis direction. In other words, each of the Hall sensors 29, the enlarged diameter part 27 and the magnets 28 are disposed at positions relatively staggered along the handle axis direction.

In addition, a positioning protrusion part 31 for positioning in the axial direction and the circumferential direction of the right handle bar 15 is erectly provided inside the right switch box 25. The positioning protrusion part 31 is erectly provided on the inner surface of the right switch box 25 so as to be substantially orthogonal to the axis C, at an intermediate position in the handle axis direction in the right switch box 25. A tip engaging part 31a is engaged with an engaging hole 31b formed in the right handle bar 15.

Of the Hall sensors 29, one is attached to the side wall 25b on the handle base end side of the right switch box 25, and the other is attached to the positioning protrusion part 31.

In the throttle device, the sensor condition is determined by comparing the magnitudes of magnetic forces detected by the Hall sensors 29.

Figure 3:
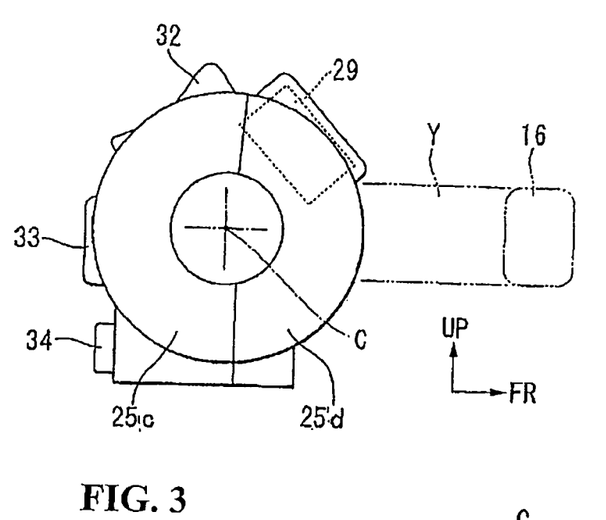
FIG. 3 is a view, as viewed from the handle tip side, of a right switch box mounted to a right handle bar of the motorcycle.

Referring to FIG. 3, each of the Hall sensors 29 is disposed at a position on the front side and upper side relative to the axis C in the right switch box 25. Here, symbol Y in FIG. 3 denotes the swinging range within which the front brake lever 16 on the front side of the throttle grip 21 is swung toward and away from the throttle grip 21.

Each of the Hall sensors 29 mounted on the handle base end side in the right switch box 25 is disposed at a position which lies in the vicinity of a fulcrum of the front brake lever 16 (in the vicinity of the clamp 17a and the brake master cylinder 17) and which is deviated to the upper side from the above-mentioned swinging range Y. The right switch box 25 is split in the vicinity of the axis C into front body 25c and rear body 25d, and the Hall sensors 29 are disposed in the front-side split body 25d. In addition, the right switch box 25 may be split in the vicinity of the axis C into upper and lower bodies.

A kill switch 32 for stopping the engine 5 is provided at a portion, on the rear side and upper side relative of the axis C, of the right switch box 25. A hazard switch 33 for a hazard lamp, for example, is provided at a portion, just on the rear side of the axis C, of the right switch box 25. A starter switch 34 for starting the engine 5 is provided at a portion, on the rear side and lower side relative to the axis C, of the right switch box 25. In addition, the switches 32, 33, 34 are disposed on the rear-side split body 25c of the right switch box 25.

The switches 32, 33, 34 to be operated manually are disposed on the handle tip side (the throttle grip 21 side) on the right switch box 25. In addition, the Hall sensors 29 are disposed on the handle base end side relative to the switches 32, 33, 34. In addition, as shown in FIG. 2, a return spring 35 for urging the throttle grip 21 toward the throttle-closing side is disposed on the handle tip side (the side on which the switches 32, 33, 34 are disposed) inside the right switch box 25.

The return spring 35 is a torsion coil spring through which the extension part 24 is passed. The Hall sensors 29 are disposed on the handle base end side relative to the return spring 35. Of coil ends of the return spring 35, one is engaged with the positioning protrusion part 31, whereas the other is engaged with an engaging protrusion part 36 provided at the outer periphery of the extension part 24.

Referring to FIG. 2, a slit-shaped notch hole 37 extending along the turning direction of the throttle grip 21 is provided in an intermediate part, in the handle axis direction, of the extension part 24 of the throttle grip 21. The notch hole 37 is provided at a position corresponding to the positioning protrusion part 31 of the right switch box 25, and the tip engaging part 31a of the positioning protrusion part 31 is engaged with the engaging hole 31b in the right handle bar 15 by way of the notch hole 37.

The notch hole 37 and the positioning protrusion part 31 constitute turning range determining means which determine a limit position of turning toward the throttle-closing side and a limit position of turning toward the throttle-opening side, for the throttle grip 21. More specifically, with the throttle grip 21 turned toward the throttle-closing side and with the positioning protrusion part 31 abutted on one end in the turning direction of the notch hole 37, a throttle full-opening position of the throttle grip 21 is determined. On the other hand, with the throttle grip 21 turned toward the throttle-opening side and with the positioning protrusion part 31 abutted on the other end in the turning direction of the notch hole 37, a throttle full-closing position of the throttle grip 21 is determined.

As has been described above, the throttle device for a vehicle (motorcycle 1) in this embodiment includes the throttle grip 21 turnably supported on the right handle bar 15. The right switch box 25 for containing and holding the extension part 24 extends toward the handle base end side of the throttle grip 21. The turning amount of the throttle grip 21 is detected by use of the magnetic sensor 26 arranged inside the right switch box 25. The extension part 24 of the throttle grip 21 is provided at the outer periphery thereof with the enlarged diameter part 27 for holding the magnets 28 of the magnetic sensor 26. The right switch box 25 is provided with the Hall sensors 29 of the magnetic sensor 26. The enlarged diameter part 27 and each of the Hall sensors 29 are opposed to each other in the axial direction of the right handle bar 15.

According to this configuration, the enlarged diameter part 27 at the outer periphery of the throttle grip 21 and each of the Hall sensors 29 provided on the side of the right switch box 25 are opposed to each other in the axial direction of the right handle bar 15, whereby an increase in size of the right switch box 25 in the radial direction of the right handle bar 15 can be restrained. Consequently, even in the case where an existing lever member (the front brake bar 16) having an adjusting mechanism is disposed on the front side of the throttle grip 21, the layout space inclusive of a space for the stroke of the lever member can be secured easily.

In addition, in the throttle device, with the Hall sensors 29 disposed on both sides of the enlarged diameter part 27 in the axial direction of the right handle bar 15, the sensor condition can be determined by comparing outputs from the Hall sensors 29.

Further, in the throttle device, the base end side of the front brake lever 16 disposed on the front side of the throttle grip 21 is swingably supported on the right handle bar 15 at a position on the base end side relative to the right switch box 25, and the Hall sensors 29 are disposed on the front side of the right switch box 25 and on the upper side relative to the swinging range Y of the front brake lever 16. Thus, the Hall sensors 29 can be disposed while avoiding switches disposed on the rear side (the rider's side) in the right switch box 25. In addition, with the Hall sensors 29 disposed on the upper side in the right switch box 25, flooding in the right switch box 25 can be restrained, and the swinging range Y of the front brake lever 16 on the front side of the right switch box 25 can be easily secured.

In the throttle device, the right switch box 25 is provided with the switches 32, 33, 34 to be manually operated, and the Hall sensors 29 are disposed at positions on the handle base end side relative to the positions of the switches 32, 33, 34 in the right switch box 25, whereby the switches 32, 33, 34 to be manually operated can be disposed closer to the throttle grip 21 gripped by the rider, so that the operability of the switches 32, 33, 34 can be enhanced.

In the throttle device, the return spring 35 for the throttle grip 21 is provided in the right switch box 25, and the Hall sensors 29 are disposed in the right switch box 25 at positions on the handle base end side relative to the return spring 35, whereby the return spring 35 for the throttle grip 21 gripped by the rider can be disposed closer to the throttle grip 21, so that a reaction force of the return spring 35 can be exerted on the throttle grip 21 comparatively directly. Thus, the feeling in operating the throttle grip 21 can be improved.

In the throttle device, the extension part 24 of the throttle grip 21 is provided with the notch hole 37 along the turning direction thereof, the positioning protrusion part 31 of the right switch box 25 for positioning with respect to the right handle bar 15 is passed through the notch hole 37, and the turning range of the throttle grip 21 is determined by the positioning protrusion part 31 and the notch hole 37. This ensures that the means for determining the turning range of the throttle grip 21 can be easily configured by utilizing the positioning protrusion part 31 for positioning the right switch box 25 with reference to the right handle bar 15.

In addition, the present invention is not limited to the above embodiment; for example, the extension part 24 may be provided at its outer periphery with a protrusion part protruding partly so as to hold the magnets 28, in place of the flange-shaped enlarged diameter part 27. In addition, there may be adopted a configuration in which the Hall sensors 29 are arranged along the turning direction of the throttle grip 21, or a configuration in which only a single Hall sensor 29 is disposed at a lateral side of the enlarged diameter part 27.

A configuration may be adopted in which the magnetic sensor 26 is disposed on the handle tip side in the right switch box 25. In that case, it suffices to provide the enlarged diameter part 27 on the handle tip side or at an intermediate portion in the handle axis direction, of the extension part 24. In such a case, the switches 32, 33, 34 are disposed on the handle base end side relative to the extension part 24.

Further, while the above embodiment corresponds to an application of the present invention to a motorcycle having a by-wire type throttle device, the present invention may be applied to a bar handle vehicle (a saddle ride type vehicle or a motor scooter type vehicle) having three or more wheels, or may be applied to vehicles other than internal combustion engine vehicles, such as electric-motor vehicles.

In addition, the configuration in the above-described embodiment is merely an example of carrying out the present invention, and various modifications are possible within the scope of the gist of the invention.

Figure 5:
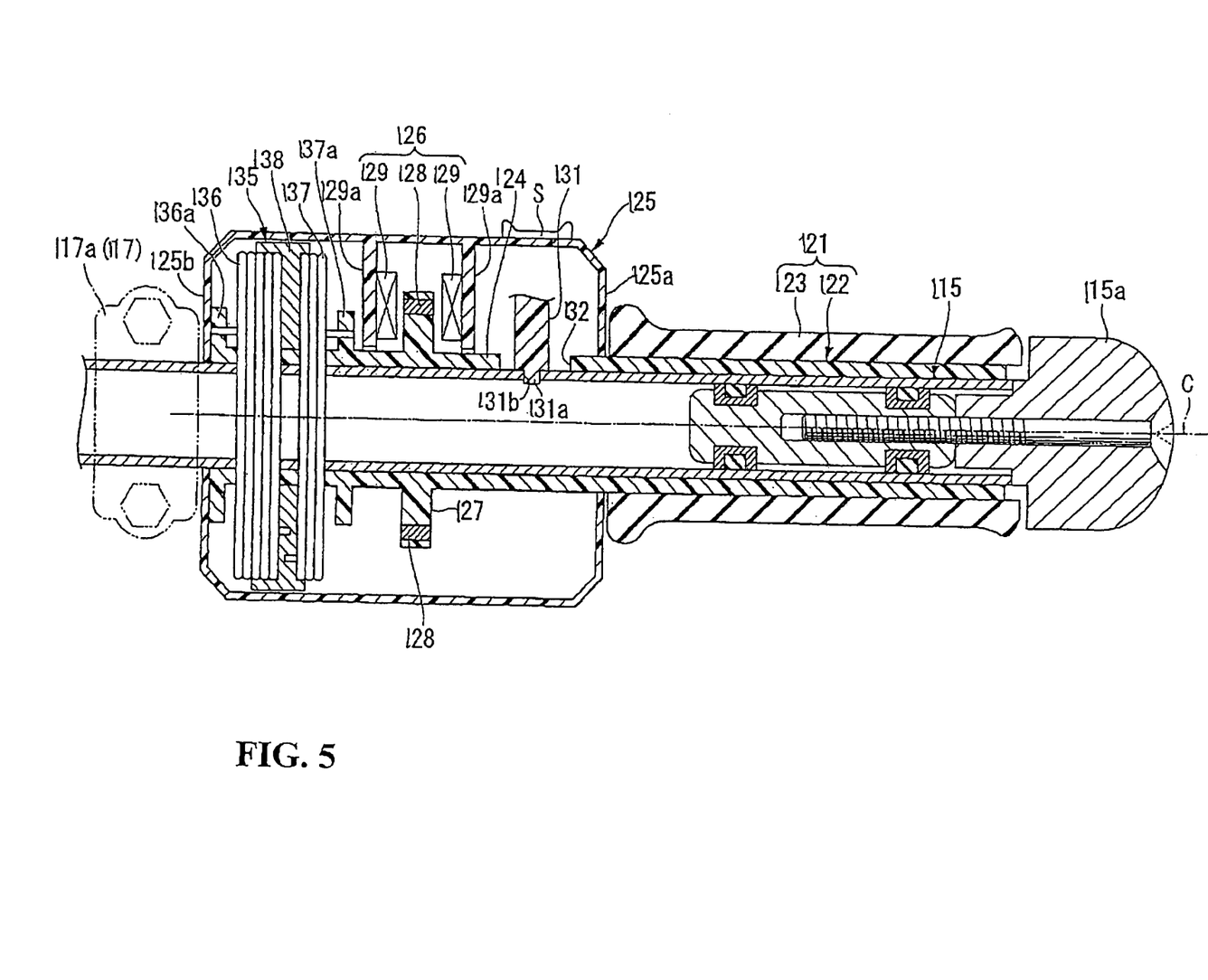
FIG. 5 is a sectional view of a second embodiment taken along line A-A of FIG. 1.

Referring to FIG.5, a throttle grip 121 through which the right handle bar 115 is passed is turnably supported on the tip side (the body left-right outer side) of the right handle bar 115. The throttle grip 121 has a resin-made sleeve 122 constituting an inner layer thereof, and a rubber-made grip body 123 integrally attached to the outer periphery of the sleeve 122. The sleeve 122 extends to the handle base end side (the body left-right center side) beyond an end part on the handle base end side of a grip body 123 to be gripped by the rider. This portion constitutes an extension part 124, extending toward the handle base end side, of the throttle grip 121.

The extension part 124 is contained and held in a right switch box 125 attached to the right handle bar 115 on the handle base end side relative to the grip body 123. On the handle base end side relative to the right switch box 125, the above-mentioned clamp 117a is attached to the right handle bar 115. In addition, symbol C in FIG. 5 denotes a center axis of the right handle bar 115 with a vibration-proofing handle weight 115a being attached to the tip side of the right handle bar 15.

Further, the throttle grip 121 is configured to be turnable between a throttle full-opening position (a position for maximizing the throttle opening) and a beyond-throttle-full-closure position located a predetermined amount beyond a throttle full-closing position (a position for minimizing the throttle opening). The throttle grip 121 functions to change the throttle opening when turned between the throttle full-opening position and the throttle full-closing position, but does not change the throttle opening (namely, it keeps the throttle opening at a minimum) when turned between the throttle full-closing position and the beyond-throttle-full-closure position.

When the throttle grip 121 is turned to the beyond-throttle-full-closure position in the condition where the constant vehicle speed maintaining control (auto cruise control) is conducted by the constant vehicle speed maintaining system, the constant vehicle speed maintaining control is cancelled by the turning.

In addition, the amount of turning of the throttle grip 121 from the throttle full-closing position to the beyond-throttle-full-closure position is designed to be smaller than the amount of turning from the throttle full-closing position to the throttle full-opening position. Further, the cancellation of the constant vehicle speed maintaining control can be made also by a brake operation, a clutch operation or the like, in addition to the turning of the throttle grip 121 to the beyond-throttle-full-closure position.

Figure 6:
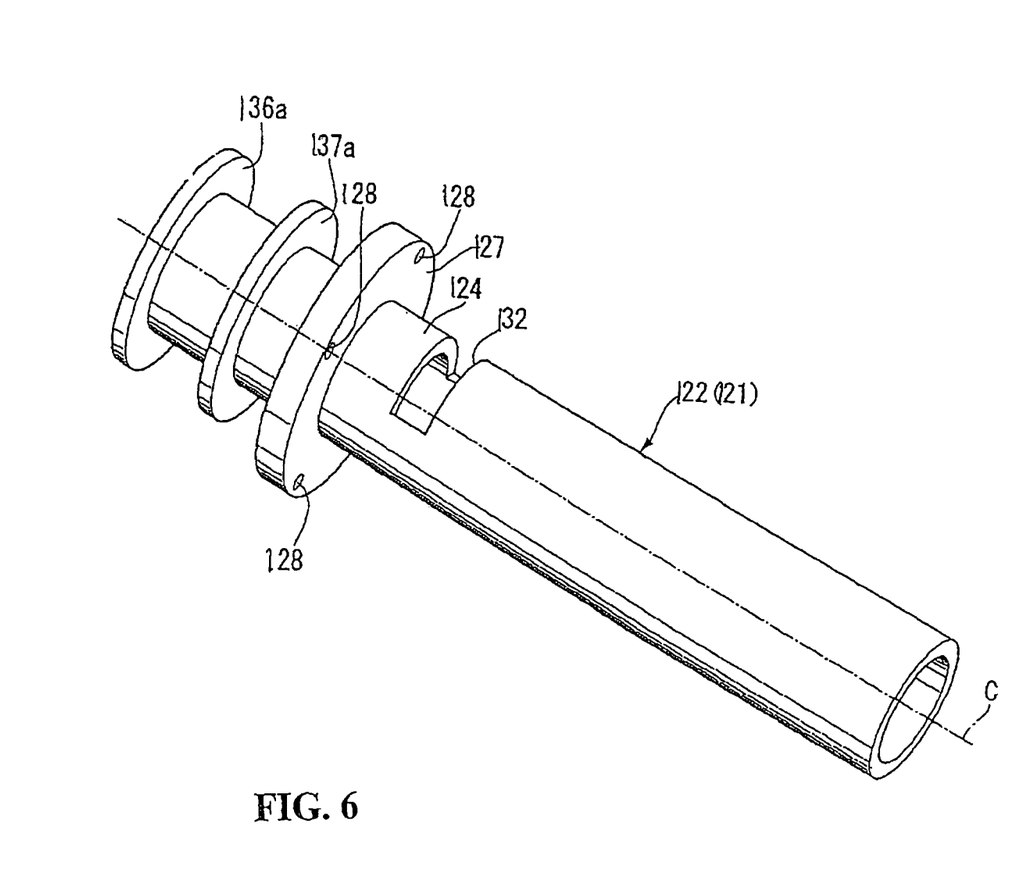
FIG. 6 is a perspective view of a sleeve of a throttle grip in the motorcycle of a second embodiment.

As shown in FIGS. 5 and 6, an intermediate part, in the handle axis direction (the direction along the axis C), of the extension part 124 of the throttle grip 121 is integrally provided at its outer periphery with an enlarged diameter part 127 which is flange-shaped, for example. In the enlarged diameter part 127, a plurality of magnets 128 of the magnetic sensor 126 are held in the state of, for example, being arranged along the circumferential direction (the turning direction of the throttle grip 121).

The extension part 124 penetrates a side wall 125a on the handle tip side (the body left-right outer side) of a right switch box 125, and a tip part of the extension part 124 reaches the vicinity of a side wall 125b on the handle base end side of the right switch box 125.

On the other hand, Hall sensors 129 as sensor bodies of the magnetic sensor 126 are integrally held in the right switch box 125 at intermediate positions in the handle axis direction. Each of the Hall sensors 129 is provided at one position in the turning direction of the throttle grip 121 with reference to the plurality of the magnets 128, and the Hall sensors 129 detect the turning amount of the throttle grip 121 according to a magnetic force which varies depending on the turned positions of the magnets 128.

A pair of the Hall sensors 129 are provided respectively on both sides of the enlarged diameter part 127 in the axial direction of the right handle bar 115 (the handle axis direction). Thus, each of the Hall sensors 129 and the enlarged diameter part 127 (the magnets 128) are opposed to each other in the handle axis direction. In other words, each of the Hall sensors 129, the enlarged diameter part 127 and the magnets 128 are disposed at positions relatively staggered along the handle axis direction.

In the right switch box 125, a pair of support walls 129a substantially orthogonal to the handle axis direction are erectly provided respectively on both sides of the enlarged diameter part 127 in the handle axis direction, and the Hall sensors 129 are attached to the support walls 129a, respectively.

In this throttle device, the sensor condition is judged by comparing the magnitudes of magnetic forces detected by the Hall sensors 129.

Manual switches such as a kill switch for stopping the engine 5, a lamp switch for a head lamp, and a starter switch for starting the engine 5 (these switches are generically denoted by symbol S in FIG. 5) are provided on the handle tip side in the right switch box 125.

On the handle tip side in the right switch box 125, a positioning protrusion part 131 is erectly provided for positioning in the axial direction and the circumferential direction of the right handle bar 115. The positioning protrusion part 131 is provided to erect from the inside surface of the right switch box 125 substantially orthogonally to the axis C, and has a tip engaging part 131a engaged with an engaging hole 131b formed in the right handle bar 115.

On the other hand, the extension part 124 of the throttle grip 121 is provided on its handle tip side with a slit-shaped notch hole 132 extending along the turning direction of the throttle grip 121. The notch hole 132 is provided at a position corresponding to the positioning protrusion part 131 of the right switch box 125, and the tip engaging part 131a of the positioning protrusion part 131 is engaged with the engaging hole 131b in the right handle bar 115 by way of the notch hole 132.

The notch hole 132 and the positioning protrusion part 131 constitute turning range determining means which determine a limit position of turning toward the throttle-opening side (throttle full-opening position) and a limit position of turning toward the throttle-closing side (beyond-throttle-full-closure position), for the throttle grip 121. More specifically, with the throttle grip 121 turned toward the throttle-opening side and with the positioning protrusion part 131 abutted on one end in the turning direction of the notch hole 132, the throttle full-opening position of the throttle grip 121 is determined. On the other hand, with the throttle grip 121 turned toward the throttle-closing side and with the positioning protrusion part 131 abutted on the other end in the turning direction of the notch hole 132, the beyond-throttle-full-closure position of the throttle grip 121 is determined.

In addition, the throttle grip 121 stops turning upon receiving an urging force from a grip urging mechanism 135 at the throttle full-closing position.

The grip urging mechanism 135 is disposed on the handle base end side in the right switch box 125, and is composed mainly of a first return spring 136 for urging the throttle grip 121 toward the throttle-closing side, a second return spring 137 for urging the throttle grip 121 toward the throttle-opening side, and a spring case 138 for containing the return springs 136, 137.

The return springs 136, 137 are torsion coil springs through which the extension part 124 is passed, and they are disposed coaxially so as to have the axis C in common. In addition, the spring case 138 has a circular disk-like shape substantially coaxial with the return springs 136, 137, and is provided on both sides thereof with recessed parts, in which one-side parts of the return springs 136, 137 are contained.

A pair of engaging protrusion parts 136a, 137a which are flange-like in shape, for example, are provided at the outer periphery on the handle base end side of the extension part 124 of the throttle grip 121 in such a manner as to be located on both sides of the grip urging mechanism 135 in the handle axis direction. One-side coil ends of the return springs 136, 137 are engaged respectively with the engaging protrusion parts 136a, 137a. The other-side coil ends of the return springs 136, 137 are engaged with the spring case 138.

The spring case 138 is fixedly supported on the right switch box 125, and, when the throttle grip 121 is turned, the throttle grip 121 and the spring case 138 are turned relative to each other, whereby the return springs 136, 137 are elastically deformed, as required.

Incidentally, the first return spring 136 and the engaging protrusion part 136a are located on the handle base end side of the spring case 138, whereas the second return spring 137 and the engaging protrusion part 137a are located on the handle tip side of the spring case 138. In addition, the number of coil turns of the first return spring 136 is larger than that of the second return spring 137, and the spring reaction force of the first return spring 136 is stronger than that of the second return spring 137.

The return springs 136, 137 are set so that their reaction forces are, for example, 0 (zero) when the throttle grip 121 is at the throttle full-closing position. This ensures that, when the throttle grip 121 is at the throttle full-closing position, the spring reaction force toward the throttle-opening side is balanced with that toward the throttle-closing side, and the turning of the throttle grip 121 is stopped at the throttle full-closing position. When the throttle grip 121 is turned from the throttle full-closing position toward the side of the throttle full-opening position or toward the side of the beyond-throttle-full-closure position, the throttle grip 121 is urged toward the throttle full-closing position by the spring reaction force of either of the return springs 136, 137.

When the throttle grip 121 is at the throttle full-closing position, the turning thereof is stopped by only the spring reaction forces supplied from the return springs 136, 137. This ensures that a comparatively large operating force is not needed in the vicinity of the throttle full-closing position, unlike in the related art, and that the throttle grip 121 can be continuously turned from the throttle full-opening position to the beyond-throttle-full-closure position by only a comparatively small operating force for just resisting the spring reaction force.

The engaging protrusion part 136a is so formed that its engaging part for engagement with the coil end of the first return spring 136 is a slot, for example. This ensures that, when the throttle grip 121 is turned from the throttle full-closing position toward the throttle full-opening position, the engaging protrusion part 136a is engaged with the first return spring 136 and elastically deforms the latter, thereby receiving the spring reaction force of the latter. On the other hand, when the throttle grip 121 is turned from the throttle full-closing position toward the beyond-throttle-full-closure position, the engaging protrusion part 136a is disengaged from the first return spring 136 so as not to receive any spring reaction force of the latter.

Similarly, the engaging protrusion part 137a is formed so that its engaging part for engagement with the coil end of the second return spring 137 is a slot, for example. This ensures that, when the throttle grip 121 is turned from the throttle full-closing position toward the throttle full-opening position, the engaging protrusion part 137a is disengaged from the second return spring 137 so as not to receive any spring reaction force of the latter. On the other hand, when the throttle grip 121 is turned from the throttle full-closing position toward the beyond-throttle-full-closure position, the engaging protrusion part 137a is engaged with the second return spring 137 and elastically deforms the latter, thereby receiving the spring reaction force of the latter.

When the throttle grip 121 is turned to the beyond-throttle-full-closure position at the time of the constant vehicle speed maintaining control by the constant vehicle speed maintaining system, the constant vehicle speed maintaining system cancels the constant vehicle speed maintaining control on the basis of the detection data sent from the magnetic sensor 126.

In addition, a predetermined turning range in the vicinity of the throttle full-closing position of the throttle grip 121 is made to be a control dead zone based on a mechanical play of the throttle grip 121 or the like factor. In that range, various controls by the turning of the throttle grip 121 are disabled.

As has been described above, the throttle device for a vehicle (motorcycle 1) in this embodiment has a configuration wherein the throttle grip 121 turnably supported on the right handle bar 115 is turnable between the throttle full-opening position and the beyond-throttle-full-closure position located beyond the throttle full-closing position, and a predetermined motive power control (for example, cancellation of the constant vehicle speed maintaining control) is conducted when the throttle grip 121 is turned to the beyond-throttle-full-closure position. In addition, the throttle grip 121 is urged by the grip urging mechanism 135 toward the throttle full-closing position from each of the side of the throttle full-opening position and the side of the beyond-throttle-full-closure position, and the throttle full-closing position is maintained by only the urging force supplied from the grip urging mechanism 135. Further, the magnetic sensor 126 for detecting that the throttle grip 121 has been turned to the beyond-throttle-full-closure position is provided inside the right switch box 125 which holds the handle base end side of the throttle grip 121.

According to this configuration, the magnetic sensor 126 for detecting the turning of the throttle grip 121 to the beyond-throttle-full-closure position is provided inside the right switch box 125 for holding the handle base end side of the throttle grip 121, whereby the magnetic sensor 126 and the throttle grip 121 can be linked directly to each other, which makes it possible to simplify the configuration necessary for detecting the turning of the throttle grip 121 and to enhance the accuracy of detection.

In addition, the throttle grip 121 is urged by the grip urging mechanism 135 toward the throttle full-closing position from each of the side of the throttle full-opening position and the side of the beyond-throttle-full-closure position. The throttle full-closing position is maintained by only the urging force supplied from the grip urging mechanism 135, which ensures that the throttle grip 121 can be continuously turned in the vicinity of the throttle full-closing position by a comparatively small operating force for just resisting the urging force supplied exerted from the grip urging mechanism 135. This makes it possible to reduce the operation load on the throttle grip 121 in the vicinity of the throttle full-closing position and to lessen the operation load necessary for a predetermined motive power control.

In the throttle device as above, the magnetic sensor 126 detects electrically the turning amount of the throttle grip 121, which makes it possible to easily configure a so-called by-wire type throttle device for electrically detecting the turning amount of the throttle grip 121 and electrically controlling the throttle opening on the basis of the detection data.

In the throttle device as described above, the notch hole 132 along the turning direction of the throttle grip 121 is provided on the handle base end side of the throttle grip 121, the positioning protrusion part 131 of the right switch box 125 for positioning with respect to the right handle bar 115 is passed through the notch hole 132, and the turning range of the throttle grip 121 is determined by the positioning protrusion part 131 and the notch hole 132. This ensures that means for determining the turning angle of the throttle grip 121 can be easily configured by utilizing the positioning protrusion part 131 of the right switch box 125 for positioning with respect to the right handle bar 115.

In the throttle device as above, the manual switches S are provided on the right switch box 125 at positions on the handle tip side, the grip urging mechanism 135 is disposed on the handle base end side in the right switch box 125, and the magnetic sensor 126 is disposed between the grip urging mechanism 135 and the switches S. This ensures that the switches S, the grip urging mechanism 135 and the magnetic sensor 126 are aligned in the axial direction of the right handle bar 115 for restraining an increase in the size of the right switch box 125 in the radial direction of the right handle bar 115. Thus, it is possible to easily secure the layout space in the case where an existing lever member having an adjusting mechanism is disposed on the front side of the throttle grip 121. Further, it is possible to dispose the manual switches S close to the throttle grip 121 gripped by the rider, thereby enhancing the operability of the switches S, and to dispose the switches S and the magnetic sensor 126 adjacent to each other, thereby facilitating connection of electric wires.

Now, a third embodiment of the present invention will be described below, referring to FIG. 7.

This embodiment differs from the second embodiment above mainly in that a grip urging mechanism has a single return spring 246.

Each of the Hall sensors 229 mounted on the handle base end side in the right switch box 225 is disposed at a position which lies in the vicinity of a fulcrum of the front brake lever (in the vicinity of the clamp 217a and the brake master cylinder 217) and which is deviated to the upper side from the above-mentioned swinging range Y. The right switch box 225 is split in the vicinity of the axis C into front body and rear body, and the Hall sensors 229 are disposed in the front-side split body. In addition, the right switch box 225 may be split in the vicinity of the axis C into upper and lower bodies.

Figure 7:
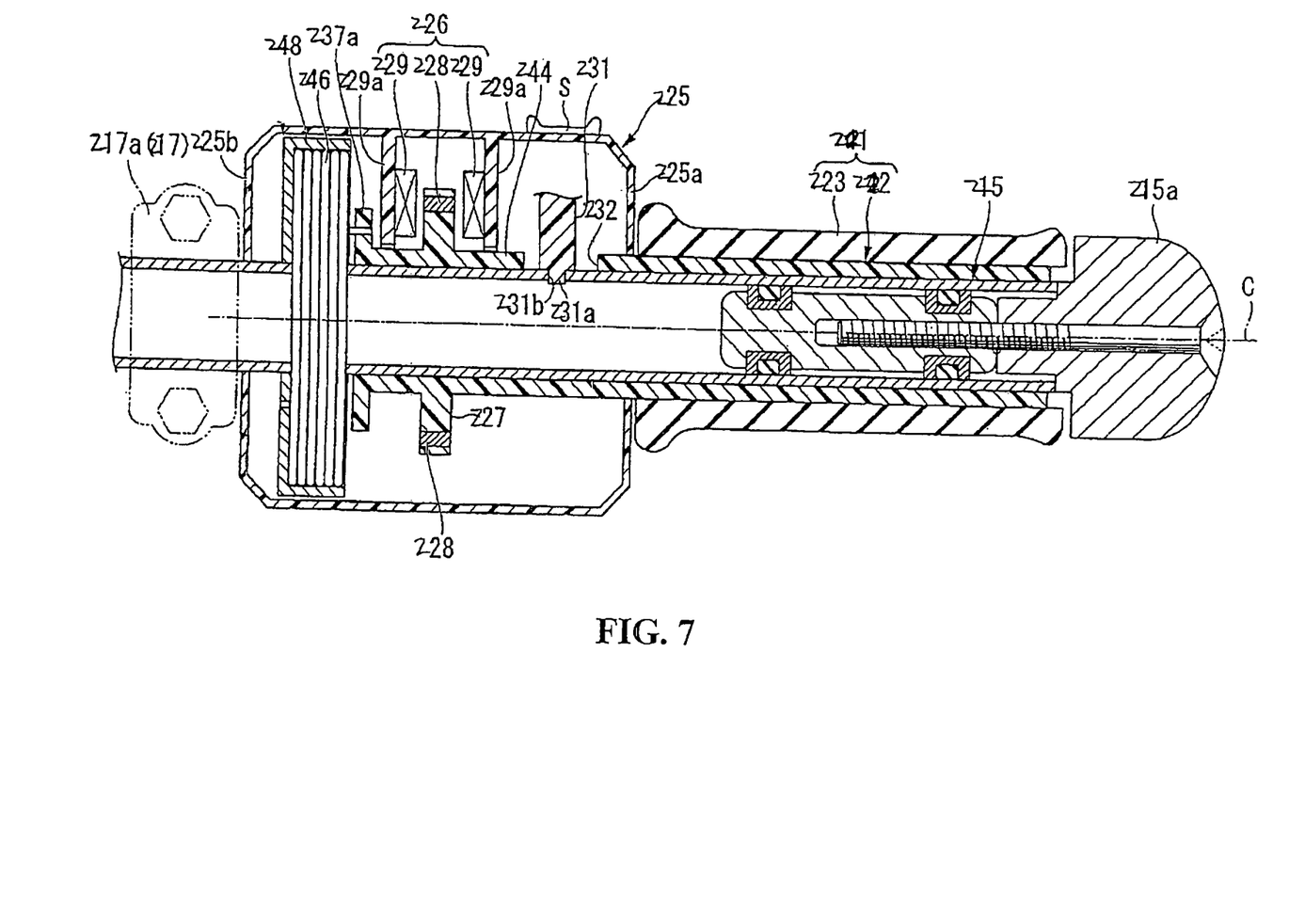
FIG. 7 is a sectional view, corresponding to FIG. 5, of a third embodiment of the present invention.

A kill switch 232 for stopping the engine 5 is provided at a portion, on the rear side and upper side relative of the axis C, of the right switch box 225.I As shown in FIG. 7, the enlarged diameter part 227 holds a plurality of magnets 228 of the magnetic sensor 226, which are arranged along the circumferential direction (the turning direction of the throttle grip), for example. The extension part penetrates a side wall 225a on the handle tip side (the body left-right outer side) of the right switch box 225. A tip part of the extension part reaches the vicinity of a side wall 225b on the handle base end side of the right switch box 225. Thus, the enlarged diameter part 227 is disposed on the handle base end side inside the right switch box 225.

In addition, a positioning protrusion part 231 for positioning in the axial direction and the circumferential direction of the right handle bar 215 is erectly provided inside the right switch box 225. The positioning protrusion part 231 is erectly provided on the inner surface of the right switch box 225 so as to be substantially orthogonal to the axis C, at an intermediate position in the handle axis direction in the right switch box 225. A tip engaging part 231a is engaged with an engaging hole 231b formed in the right handle bar 215. Symbol C in FIG. 7 denotes a center axis of the right handle bar 215 with a vibration-proofing handle weight 215a attached to the tip side of the right handle bar 215.

In the right switch box 225, a pair of support walls 229a substantially orthogonal to the handle axis direction are erectly provided respectively on both sides of the enlarged diameter part 227 in the handle axis direction, and the Hall sensors 229 are attached to the support walls 229a, respectively.

Referring to FIG. 7, a throttle grip 221 through which the right handle bar 215 is passed is turnably supported on the tip side (the body left-right outer side) of the right handle bar 215. The throttle grip 221 has a resin-made sleeve 222 constituting an inner layer thereof, and a rubber-made grip body 223 integrally attached to the outer periphery of the sleeve 222. The sleeve 222 extends to the handle base end side (the body left-right center side) beyond an end part on the handle base end side of a grip body 223 to be gripped by the rider. This portion constitutes an extension part 224, extending toward the handle base end side, of the throttle grip 221.

An extension part 244 of a throttle grip 221 (sleeve 222) in this embodiment differs from the extension part 124 of the throttle grip 121 described above in that its portion on the handle base end side relative to an engaging protrusion part 237a is cut away.

The grip urging mechanism is disposed on the handle base end side in a right switch box 225, and is composed mainly of the single return spring 246 by which an urging force toward the throttle-closing side and an urging force toward the throttle-opening side are exerted on a throttle grip 221, and a spring case 248 for containing the return spring 246.

The return spring 246 is a torsion coil spring through which to pass a right handle bar 215, and is disposed so as to have an axis C in common. In addition, the spring case 248 has a circular disk-like shape substantially coaxial with the return spring 246, and is provided on the handle tip side thereof with a recessed part, in which the return spring 246 is contained.

Of the coil ends of the return spring 246, one is engaged with the engaging protrusion part 237a, whereas the other is engaged with the spring case 248.

The spring case 248 is fixedly supported on the right switch box 225, and, when the throttle grip 221 is turned, the throttle grip 221 and the spring case 248 are turned relative to each other, whereby the return spring 246 is elastically deformed, as required.

The return spring 246 is formed so that its spring reaction force is, for example, 0 (zero) when the throttle grip 221 is at the throttle full-closing position. This ensures that, when the throttle grip 221 is at the throttle full-closing position, the urging force toward the throttle-opening side is balanced with that toward the throttle-closing side, and the turning of the throttle grip 221 is stopped at the throttle full-closing position. When the throttle grip 221 is turned from the throttle full-closing position toward either of the side of the throttle full-opening position and the side of the beyond-throttle-full-closure position, the throttle grip 221 is urged toward the throttle full-closing position by the spring reaction force of the return spring 246.

With the grip urging mechanism thus configured by use of the single return spring 246, a reduction in the number of component parts attended by a reduction in cost is promised, in addition to the effects described in the first embodiment above.

In addition, the present invention is not limited to the above-described embodiments. For example, the turning of the throttle grip to the beyond-throttle-full-closure position may be utilized for motive power controls, such as an idling-stopping control, a changeover among operating modes such as a sport mode and a low-fuel-consumption mode, a gear change in a transmission, etc.

In addition, the order of layout of the switches, the grip urging mechanism and the sensor may be changed insofar as these components are aligned in the handle axis direction.

Further, while the above-described embodiments correspond to application of the present invention to a motorcycle having a by-wire type throttle device and a constant vehicle speed maintaining system, the invention is applicable also to ordinary motorcycles not having these configurations. Also, the invention may be applied to bar handle vehicles (saddle ride type vehicles and motor scooter type vehicles) having three or more wheels, and may be applied to electric motor vehicles other than internal combustion engine vehicles.

Further, the configurations in the above embodiments are mere examples of the present invention, and, naturally, various modifications are possible within the scope of the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A throttle device for a vehicle, comprising:
    a throttle grip rotatably, turnably supported on a handle bar; and
    a housing for containing and holding an extension part of said throttle grip, said extension part extending toward a handle bar base end side, the rotational turning amount of said throttle grip being detected by use of a magnetic sensor arranged in said housing, said throttle grip and said housing being axially arranged relative to said handle bar;
    wherein said extension part of said throttle grip is provided at the outer periphery thereof with an enlarged diameter part for holding a magnet of said magnetic sensor, said housing is equipped with a first sensor body positioned on the handle bar base end side of said magnetic sensor and a second sensor body positioned on a handle bar tip end side of said magnetic, said first sensor body and said second sensor body being disposed one on each side of said magnet in an axial direction of said handle bar, wherein said enlarged diameter part and said first and second sensor bodies are opposed to each other in the axial direction of said handle bar;
    said first and second sensor bodies detecting the turning amount of the throttle grip according to a magnetic force that varies depending on the turning position of the magnet.

2. The throttle device for the vehicle as set forth in claim 1, wherein the base end side of a lever member disposed on the front side of said throttle grip is swingably supported on said handle bar at a position on the base end side relative to said housing, and said first sensor body is disposed on a front side in said housing and on the upper side relative to the swinging range of said lever member.

3. The throttle device for the vehicle as set forth in claim 2, wherein said housing is equipped with a manual switch, and said first and second sensor bodies are disposed in said housing at a position on the handle bar base end side or on the handle tip side relative to said switch.

4. The throttle device for the vehicle as set forth in claim 2, wherein a return spring for said throttle grip is provided in said housing, and said first sensor body is disposed in said housing at a position on the handle bar base end side relative to said return spring.

5. The throttle device for the vehicle as set forth in claim 1, wherein said housing is equipped with a manual switch, and said first and second sensor bodies are disposed in said housing at a position on the handle bar base end side or on the handle tip side relative to said switch.

6. The throttle device for the vehicle as set forth in claim 5, wherein a return spring for said throttle grip is provided in said housing, and said first sensor body is disposed in said housing at a position on the handle bar base end side relative to said return spring.

7. The throttle device for the vehicle as set forth in claim 1, wherein a return spring for said throttle grip is provided in said housing, and said first sensor body is disposed in said housing at a position on the handle bar base end side relative to said return spring.

8. The throttle device for the vehicle as set forth in claim 1, wherein said extension part of said throttle grip is provided with a notch hole along the turning direction thereof, a positioning protrusion part of said housing for positioning with respect to said handle bar is passed through said notch hole, and the turning range of said throttle grip is determined by said positioning protrusion part and said notch hole.

9. The throttle device for the vehicle as set forth in claim 1, wherein said housing is split into front and rear bodies, and said first and second sensors are disposed on the front side in said housing while switches are disposed on the rear side in the housing.

* * * * *